United States Patent [19]

Wunderlich

[11] 3,998,303
[45] Dec. 21, 1976

[54] SHOE HOLD DOWN RETAINER FOR DRUM BRAKES

[75] Inventor: Langley H. Wunderlich, Dayton, Ohio

[73] Assignee: General Motors Corporation, Detroit, Mich.

[22] Filed: Feb. 23, 1976

[21] Appl. No.: 660,497

[52] U.S. Cl. .................................. 188/340
[51] Int. Cl.² ........................... F16D 51/18
[58] Field of Search .............. 188/340, 341, 250 F, 188/234, 331, 333, 78, 335, 216

[56] References Cited

UNITED STATES PATENTS

| 2,740,498 | 4/1956 | Trahern, Jr. | 188/78 |
| 2,755,889 | 7/1956 | Schnell | 188/78 |
| 2,999,566 | 9/1961 | Naudzius | 188/78 |
| 3,152,664 | 10/1964 | Swift | 188/78 |
| 3,186,519 | 6/1965 | Johannesen | 188/78 |
| 3,198,294 | 8/1965 | Stacy | 188/234 |
| 3,548,976 | 12/1970 | Dombeck | 188/340 X |
| 3,554,330 | 1/1971 | Harrison | 188/216 X |
| 3,869,027 | 3/1975 | Chlebowski | 188/340 |

Primary Examiner—Trygve M. Blix
Assistant Examiner—Douglas C. Butler
Attorney, Agent, or Firm—D. D. McGraw

[57] ABSTRACT

A drum brake shoe hold down retainer is formed as a one piece device with a main body having barbs which grip both sides of the shoe backing plate. The upper end of the body is formed with radially outwardly extending legs which are reversely bent to resiliently engage the shoe web. The legs provide spring forces holding the shoe in position and have small dimple-like buttons to help minimize friction between the shoe and the retainer during brake apply. The other end of the retainer is formed with a closed end to minimize entry of water through the backing plate.

4 Claims, 4 Drawing Figures

SHOE HOLD DOWN RETAINER FOR DRUM BRAKES

The invention relates to a hold down retainer for a drum brake shoe and more particularly to one which is constructed in a unitary manner with an elongated main body section. One end of the body section is closed. Two sets of spring-like barbs are circumferentially spaced about the body section axially adjacent but spaced from the closed end. The barbs extend radially and axially outward from the body section, one set extending axially away from the closed end and the other set extending axially toward the closed end. The barb sets have outer ends respectively located in planes which are substantially axially perpendicular to the axis of the main body section. The planes are spaced axially apart at a distance slightly less than the thickness of the backing plate member to which the retainer is to be fastened. The spring-like characteristics of the set of barbs closer to the closed end of the retainer permits installation through a hole in the backing plate member, the sets of barbs then engaging both sides of the backing plate member for retention. The end of the main body section opposite the closed end has radially and axially extending legs which are reversely bent first axially toward and then axially away from the closed end. These legs provide spring retention of the brake shoe web through which the main body section is inserted when installed. The closed end of the retainer minimizes the entry of splash water through the backing plate aperture, thereby keeping the interior of the brake assembly cleaner than it would otherwise be. The retainer may be installed by using an appropriate pushing tool, the aperture in the shoe web through which the retainer extends being sufficiently large to allow the sets of barbs to pass therethrough without interference. The aperture in the backing plate is approximately the same size as the main body section diameter. It therefore only allows the set of barbs to pass therethrough which are angled in an appropriate direction for this purpose. These barbs are sufficiently flexible to bend radially inward and pass through the aperture.

IN THE DRAWING

Figure 1:
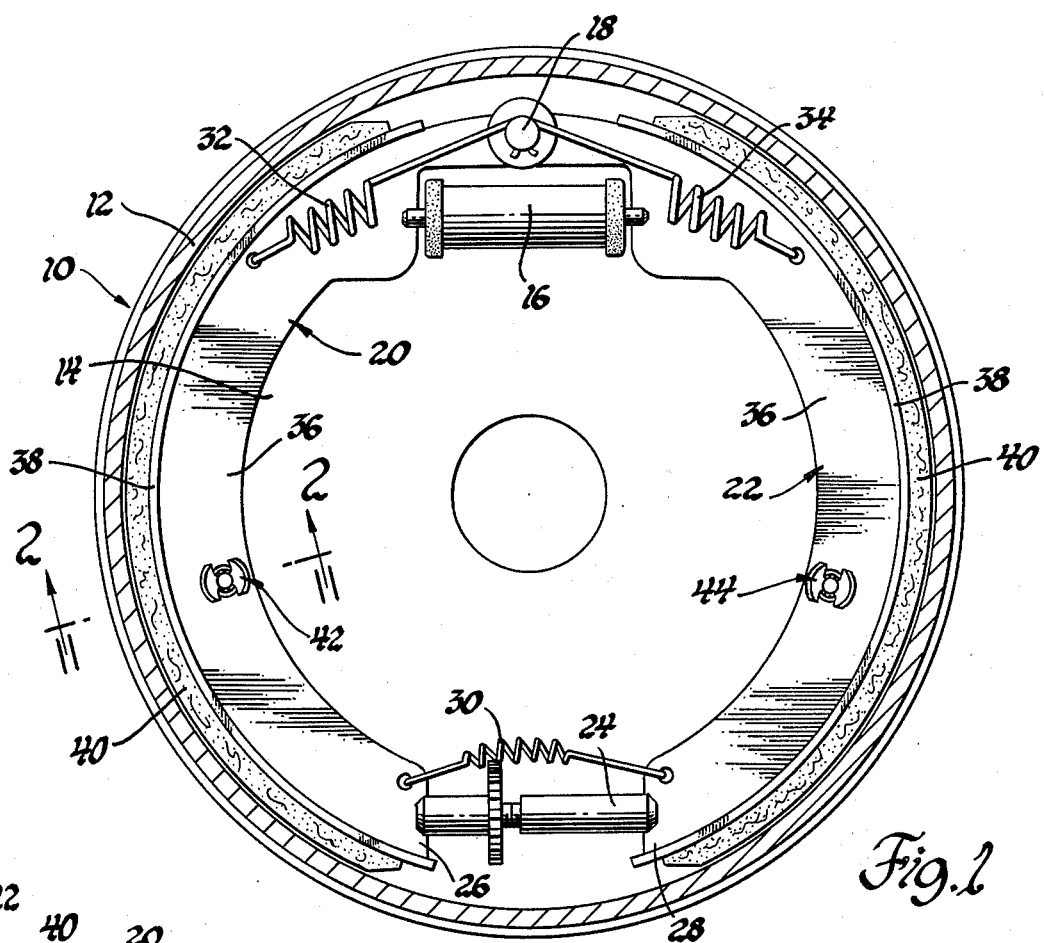
FIG. 1 is an elevation view, with parts in section, illustrating a typical brake shoe assembly embodying the invention.

The drum brake assembly 10 illustrated in FIG. 1 is of the usual construction, including the drum 12, backing plate 14, wheel cylinder 16 mounted to the backing plate, anchor pin 18 also mounted to the backing plate, primary shoe assembly 20 and secondary shoe assembly 22, an adjuster strut 24 engaging the ends 26 and 28 of the two shoe assemblies for adjustment, spring 30 connected to ends 26 and 28 of the shoe assemblies and holding the ends in engagement with adjuster strut 24, and retracting springs 32 and 34 respectively attached to the shoe assemblies 20 and 22, and also attached to anchor pin 18. Each shoe assembly includes a web 36, a rim 38 and a friction lining 40 secured to the shoe rim and positioned for braking engagement with the internal surface of drum 12 when the brake is actuated.

Figure 3:
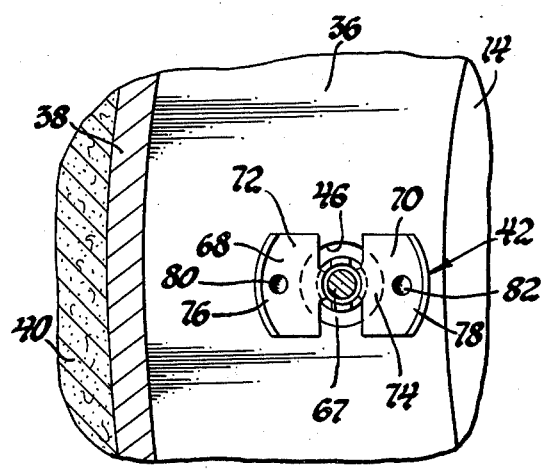
FIG. 3 is a fragmentary view taken in the direction of arrows 3—3 of FIG. 2, with parts broken away.
Figure 4:
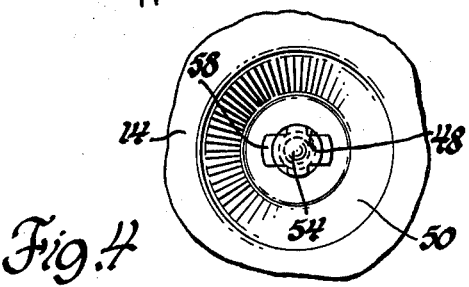
FIG. 4 is a fragmentary view taken in the direction of arrows 4—4 of FIG. 2, with parts broken away.

It has been common practice to utilize hold down assemblies attaching the shoe assemblies to the backing plate in a flexible manner so that the shoes are retained in position relative to the backing plate, as well as the wheel cylinder, during operation. These hold down assemblies usually include hold down nails, springs and retainer cups. The retainers 42 and 44 in the drawing embody the invention. The retainers are one-piece molded retainers which may be readily installed and will operate in a very satisfactory manner as hold down retainer assemblies for the shoes. Further description will be given only of retainer 42, since that retainer is illustrated in greater detail in FIGS. 2, 3 and 4. It will be understood that retainer 44 is of a similar construction.

Figure 2:
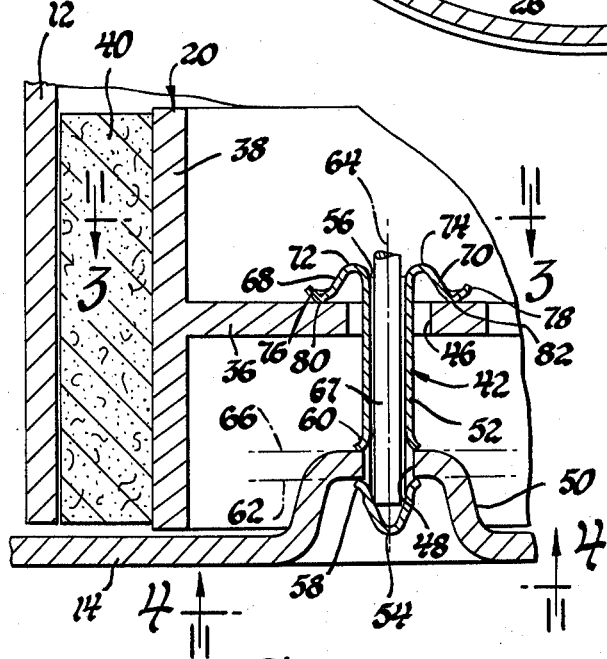
FIG. 2 is a fragmentary cross section view taken in the direction of arrows 2—2 of FIG. 1, and having parts broken away.

The shoe web 36 has an aperture 46 formed therein and, when assembled, being in general axial alignment with an aperture 48 formed in the backing plate 14. A dimple 50 is provided in the backing plate 14 so that the aperture 48 is positioned in the dimple recess as seen in FIG. 2. Aperture 46 has a larger diameter than aperture 48, for reasons which will become apparent. The retainer 42 has a generally tubular main body section 52, with a closed end 54 and an open end 56. A first set of spring-like barbs 58 extend outwardly from the main body section 52 of the retainer. They are circumferentially spaced about the body section and are axially adjacent the closed end 54 but spaced from that closed end. These barbs extend radially and axially outward from the body section. They also extend axially away from the closed end 54. A second set of spring-like barbs 60 are circumferentially spaced about the body section, extend outwardly from the body section, and are positioned axially adjacent but axially spaced from the first set of barbs 58. Barbs 60 are on the axially opposite side of the first set of barbs from the closed end 54. They likewise extend radially and axially outward. They also extend axially toward the closed end 54.

The ends of barbs 58 are located in a plane 62 which is axially perpendicular to the axis 64 of the main body section 52, and the ends of barbs 60 are located in a plane 66 which is also axially perpendicular to axis 64. Planes 62 and 66 are axially spaced apart a distance which is slightly less than the thickness of the backing plate 14 to which the retainer is fastened when installed. The aperture 48 through the backing plate 14 is only slightly larger in diameter than the diameter of the main body section 52, and is smaller in diameter than the projected diameter of the ends of barbs 58 and 60. Therefore, when the retainer is inserted with the closed end 54 passing through aperture 48, the spring-like action of barbs 58 will cause the barbs to move radially inwardly as they pass through aperture 48, and then snap out to engage the outer side of backing plate 14 in the manner shown in the drawing. In the process, the spring-like action of barbs 60 permits sufficient axial movement for this to occur, after which the barbs tightly grip both sides of the backing plate 14 to hold the retainer in position. The insertion tool 67, inserted in the retainer and used to push the retainer into position, may then be removed.

Aperture 46 is of sufficient diameter so that the outer ends of barbs 58 and 60 clear the aperture without interference during insertion.

The upper end of the retainer 42 is illustrated as having a pair of legs 68 and 70 extending generally radially outwardly from the end of the retainer. The legs are formed integrally as parts of the retainer, being reversely bent at 72 and 74, respectively, so as to extend toward closed end 54. Adjacent their outer ends the legs 68 and 70 are again reversely bent at 76 and 78, respectively, so that they then extend axially away from closed end 54. The points where reverse bends 76 and 78 occur on the legs provide points of engagement of the legs with one side of the brake shoe web 36, the legs thereby functioning to provide spring retention of the brake shoe web, and therefore of the shoe assembly to the backing plate. Dimple-like buttons 80 and 82 may be provided to minimize friction between shoe web 36 and the legs.

The retainer is a one-piece assembly which replaces a multiple part assembly, is quickly and easily installed, and provides positive location and retention while permitting the necessary movements of the shoe relative to the backing plate as the brake is applied and released.

What is claimed is:

1. A retainer for yieldably holding a drum brake shoe to a backing plate member through substantially aligned openings therein, said retainer comprising:
    an elongated tubular main body section having a closed end,
    a first set of spring-like barbs circumferentially spaced about said body section axially adjacent to but axially spaced from said closed end and extending radially outward from said body section and axially away from said closed end,
    a second set of spring-like barbs circumferentially spaced about said body section axially adjacent to but axially spaced from said first set of barbs and on the axially opposite side thereof from said closed end and extending radially outward and axially toward said closed end,
    each of said barb sets having barb outer ends located respectively in planes substantially perpendicular to the axis of said main body section, said planes being axially spaced apart a distance slightly less than the thickness of the backing plate member to which the retainer is adapted to be fastened, the spring-like characteristics of said first set of barbs facilitating the installation of said main body section through an opening in the plate member which is smaller than the radial extent of said barb sets, said barb sets adapted thereby to engage opposite sides of the backing plate member in a sandwich relation for retention of said main body section on the backing plate member, the end of said main body section opposite said closed end having radially extending spring-like legs reversely bent axially toward said closed end and adapted thereby to engage the web of the brake shoe at the opening therein and on the axially opposite side thereof from said closed end for yieldably holding the brake shoe to the backing plate member.

2. The retainer of claim 1 wherein the terminal portions of said spring-like legs are reversely bent axially away from said closed end, and wherein the main body section is sufficiently smaller than the opening in the brake shoe web and the radial extent of said terminal portions of said spring-like legs is sufficiently larger than the last named opening that the yieldable holding of the brake shoe web by said retainer provides for limited universal movement of the brake shoe with respect to the backing plate member along said terminal portions.

3. A retainer for a drum brake shoe comprising:
    an elongated main body section having a closed end,
    a first set of spring-like barbs circumferentially spaced about said body section axially adjacent but axially spaced from said closed end and extending radially and axially outward from said body section and axially away from said closed end,
    a second set of spring-like barbs circumferentially spaced about said body section axially adjacent but axially spaced from said first set of barbs and on the axially opposite side thereof from said closed end and extending radially and axially outward and axially toward said closed end,
    each of said barb sets having barb outer ends located respectively in planes substantially axially perpendicular to said main body section, said planes being axially spaced apart a distance slightly less than the thickness of the backing plate member to which the retainer is adapted to be fastened, the spring-like characteristics of said barb sets being adapted to permit installation through a hole in the backing plate member with the sets of barbs engaging opposite sides of the backing plate member for retention, the end of said main body section opposite said closed end having radially and axially extending legs reversely bent axially toward and then away from said closed end and adapted to provide spring retention of a brake shoe web through which the main body section is adapted to extend.

4. A brake shoe hold-down assembly comprising:
    a backing plate having a first aperture therein;
    a brake shoe web having a second aperture therein of larger radius than said first aperture;
    and a hold-down retainer extending through said apertures and having
        a radially spring-yieldable retainer body section formed to provide axially opposed retention barbs which are capable of passing through said larger aperture without interference, said barbs gripping opposite surfaces of said backing plate,
        and radially and axially extending and reversely bent spring arms on one end of said retainer and extending axially toward and then axially away from said barbs and engaging the surface of said shoe web opposite said backing plate to yieldably hold said shoe web to said backing plate,
    the other end of said retainer being closed so that splash water entry through said first aperture is minimized.

* * * * *